United States Patent
Sadana et al.

(10) Patent No.: US 11,081,731 B2
(45) Date of Patent: Aug. 3, 2021

(54) HIGH-CAPACITY RECHARGEABLE BATTERIES

(71) Applicant: International Business Machines Corporation, Armonk, NY (US)

(72) Inventors: Devendra K. Sadana, Pleasantville, NY (US); Yun Seog Lee, Seoul (KR); Joel P. de Souza, Putnam Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 196 days.

(21) Appl. No.: 15/787,453

(22) Filed: Oct. 18, 2017

(65) Prior Publication Data

US 2019/0115626 A1 Apr. 18, 2019

(51) Int. Cl.
*H01M 4/36* (2006.01)
*H01M 10/0562* (2010.01)
(Continued)

(52) U.S. Cl.
CPC ....... *H01M 10/0585* (2013.01); *H01M 4/131* (2013.01); *H01M 4/366* (2013.01);
(Continued)

(58) Field of Classification Search
None
See application file for complete search history.

(56) References Cited

U.S. PATENT DOCUMENTS

| | | |
|---|---|---|
| 6,409,984 B1 | 6/2002 | Hattori et al. |
| 6,558,836 B1 | 5/2003 | Whitacre et al. |

(Continued)

FOREIGN PATENT DOCUMENTS

| | | |
|---|---|---|
| CN | 1416189 A | 5/2003 |
| CN | 1601798 A | 3/2005 |

(Continued)

OTHER PUBLICATIONS

Jung, Yoon Seoketal., "Enhanced Stability of LiCoO2 Cathodes in Lithium-Ion Batteries Using Surface Modification by Atomic Layer Deposition," J. Electrochemical Society, 157 (1), 2010.*

(Continued)

*Primary Examiner* — Jonathan Crepeau
(74) *Attorney, Agent, or Firm* — Scully, Scott, Murphy & Presser, P.C.; L. Jeffrey Kelly, Esq.

(57) ABSTRACT

High-capacity and high-performance rechargeable batteries containing a cathode material layer having an improved surface roughness is provided. A cathode material layer is provided in which at least an upper portion of the cathode material layer is composed of nanoparticles (i.e., particles having a particle size less than 0.1 μm). In some embodiments, a lower (or base) portion of the cathode material layer is composed of particles whose particle size is greater than the nanoparticles that form the upper portion of the cathode material layer. In other embodiments, the entirety of the cathode material layer is composed of the nanoparticles. In either embodiment, a conformal layer of a dielectric material can be disposed on a topmost surface of the upper portion of the cathode material layer. The presence of the conformal layer of dielectric material can further improve the smoothness of the cathode material layer.

8 Claims, 3 Drawing Sheets

(51) Int. Cl.

| | | |
|---|---|---|
| *H01M 4/131* | (2010.01) | |
| *H01M 50/434* | (2021.01) | |
| *H01M 4/02* | (2006.01) | |
| *H01M 10/0585* | (2010.01) | |
| *H01M 4/62* | (2006.01) | |
| *H01M 10/0525* | (2010.01) | |
| *H01M 4/525* | (2010.01) | |
| *H01M 4/505* | (2010.01) | |
| *H01M 4/58* | (2010.01) | |

(52) U.S. Cl.
CPC ......... *H01M 4/62* (2013.01); *H01M 10/0525* (2013.01); *H01M 10/0562* (2013.01); *H01M 50/434* (2021.01); *H01M 4/505* (2013.01); *H01M 4/525* (2013.01); *H01M 4/5825* (2013.01); *H01M 2004/021* (2013.01); *H01M 2004/028* (2013.01)

(56) References Cited

U.S. PATENT DOCUMENTS

| | | |
|---|---|---|
| 6,881,393 B2 | 4/2005 | Spitler et al. |
| 7,521,151 B2 | 4/2009 | Hwang et al. |
| 7,682,750 B2 | 3/2010 | Chen |
| 8,304,115 B1 | 11/2012 | Petkov et al. |
| 8,753,772 B2 | 6/2014 | Liu et al. |
| 8,900,743 B2 | 12/2014 | Kim et al. |
| 8,956,761 B2 | 2/2015 | Reynolds et al. |
| 8,999,574 B2 | 4/2015 | Liu et al. |
| 9,093,717 B2 | 7/2015 | Sakamoto et al. |
| 9,196,924 B2 * | 11/2015 | Yada ............... H01M 10/052 |
| 9,337,509 B2 | 5/2016 | Kato et al. |
| 9,393,921 B1 | 7/2016 | Weicker et al. |
| 9,627,709 B2 | 4/2017 | Sastry et al. |
| 9,711,770 B2 | 7/2017 | Anastas et al. |
| 9,954,247 B2 | 4/2018 | Ishii et al. |
| 2009/0239148 A1 | 9/2009 | Jiang |
| 2011/0123866 A1 | 5/2011 | Pan et al. |
| 2011/0129732 A1 | 6/2011 | Bachrach et al. |
| 2011/0229761 A1 | 9/2011 | Cui et al. |
| 2011/0281161 A1 | 11/2011 | Ikeda et al. |
| 2012/0021298 A1 | 1/2012 | Maeda |
| 2014/0186694 A1 | 7/2014 | Jiang et al. |
| 2015/0084157 A1 | 3/2015 | Tegen et al. |
| 2015/0318539 A1 * | 11/2015 | Kelley ............... H01M 4/134 429/217 |
| 2016/0156062 A1 | 6/2016 | Littau et al. |
| 2016/0211547 A1 | 7/2016 | Hwang et al. |
| 2018/0205079 A1 * | 7/2018 | Takahashi ......... H01M 4/505 |

FOREIGN PATENT DOCUMENTS

| | | |
|---|---|---|
| CN | 101212051 A | 7/2008 |
| CN | 101978534 A | 2/2011 |
| CN | 103155243 A | 6/2013 |
| JP | 2015-002008 * | 1/2015 |

OTHER PUBLICATIONS

International Search Report dated Jan. 9, 2019, received in a corresponding foreign application.

Pohjalainen et al., "Effect of Li4Ti5O12 particle size on the performance of lithium ion battery electrodes at high C-rates and low temperatures", The Journal of Physical Chemistry C, Published: Jan. 14, 2015, pp. 2277-2283 vol. 119, No. 5.

Kim et al., "A stable lithium-rich surface structure for lithium-rich layered cathode materials," Nature Communications, Published Nov. 25, 2016, 8 pages, vol. 7, 13598.

Julien et al., "Optimization of Layered Cathode Materials for Lithium-Ion Batteries," Materials, Published Jul. 19, 2016, 26 pages, vol. 9, No. 7, 595.

Zhang et al., "Interfacial processes and influence of composite cathode microstructure controlling the performance of all-solid-state lithium batteries", ACS Applied Materials & Interfaces, May 8, 2017, pp. 17835-17845, vol. 9, No. 21.

Wu et al., "LiFePO4 nanoparticles embedded in a nanoporous carbon matrix: superior cathode material for electrochemical energy-storage devices", Advanced Materials, May 12, 2009, pp. 2710-2714, vol. 21, No. 25-26.

Nan et al., "Size and shape control of LiFePO4 nanocrystals for better lithium ion battery cathode materials", Nano Research, Apr. 2013, pp. 469-477, vol. 6, No. 7.

U.S. Appl. No. 15/474,434, filed Mar. 30, 2017, entitled: Three-Dimensional Thin-Film Battery Device, First Named Inventor: Yun Seog Lee, 20 pages.

Meng, "Atomic-scale surface modifications and novel electrode designs for high-performance sodium-ion batteries via atomic layer deposition", Journal of Materials Chemistry A, Apr. 2017, 23 pages, vol. 21.

List of IBM Patents or Patent Applications Treated as Related dated Oct. 18, 2017, 2 pages.

Office Action dated Jan. 2, 2020 received in U.S. Appl. No. 15/787,437 (copy not enclosed).

Office Action dated Apr. 20, 2021 received in U.S. Appl. No. 15/787,437 (copy not enclosed).

* cited by examiner

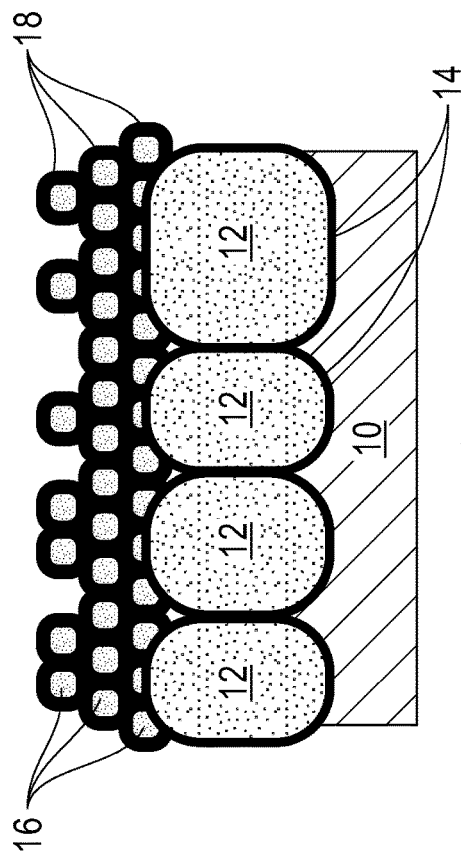
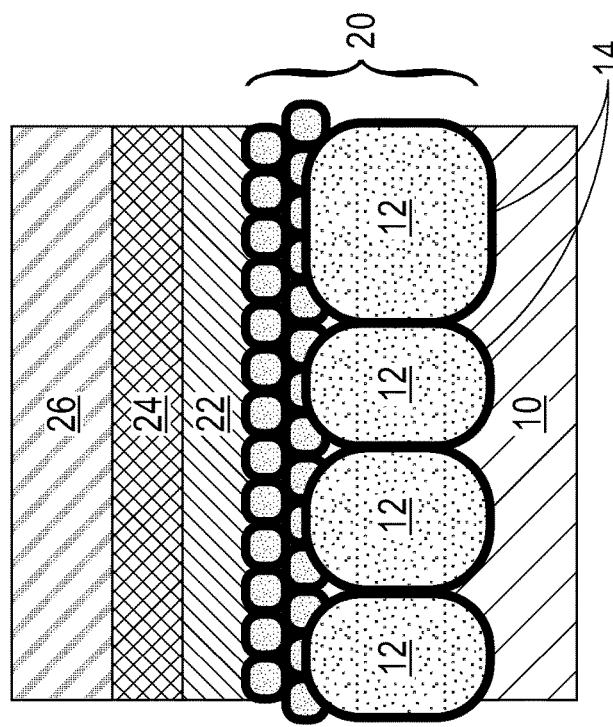
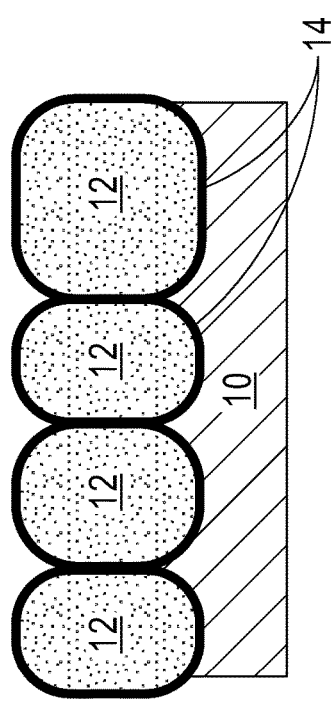
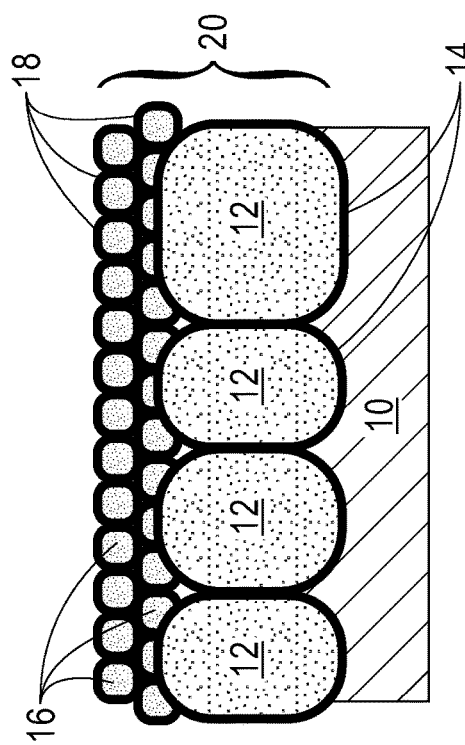

HIGH-CAPACITY RECHARGEABLE BATTERIES

RELATED APPLICATIONS

This application is related to U.S. application Ser. No. 15/787,437, filed on Oct. 18, 2017, the entire content of which is incorporated herein by reference.

BACKGROUND

The present application relates to a rechargeable battery. More particularly, the present application relates to a high-capacity and high-performance rechargeable battery, which in some embodiments may be a solid-state battery.

In recent years, there has been an increased demand for portable electronic devices such as, for example, computers, mobile phones, tracking systems, scanners, medical devices, smart watches, and fitness devices. One drawback with portable electronic devices is the need to include a power supply within the device itself. Typically, a battery is used as the power supply of such portable electronic devices. Batteries must have sufficient capacity to power the portable electronic device for at least the length that the device is being used. Sufficient battery capacity can result in a power supply that is quite heavy and/or large compared to the rest of the portable electronic device. As such, smaller sized and lighter weight power supplies with sufficient energy storage are desired. Such power supplies can be implemented in smaller and lighter weight portable electronic devices.

Another drawback of conventional batteries is that some of the batteries contain potentially flammable and toxic materials that may leak and may be subject to governmental regulations. As such and in some instances, it is desired to provide an electrical power supply, i.e., a battery, that is safe, solid-state and rechargeable over many charge/discharge life cycles; a rechargeable battery is a type of electrical battery which can be charged, discharged into a load, and recharged many times, while a non-rechargeable (or so-called primary battery) is supplied fully charged, and discarded once discharged.

In some conventional rechargeable batteries, the cathode material can be formed utilizing a thin film deposition process such as, for example, sputtering or evaporation. Thin-film deposition processes are typically limited to forming cathode material layers having a thickness of less than 5 µm and such processes have a low throughput and a high-cost ownership. In other conventional rechargeable batteries, the cathode material can be formed utilizing a slurry-based deposition process. Slurry-based deposition processes provide cathode material layers that have a rough morphology (i.e., a surface roughness greater than 2 µm root mean square, as measured by profilometry). There is thus a need for providing rechargeable batteries that contain a cathode material having improved surface roughness.

SUMMARY

High-capacity and high-performance rechargeable batteries containing a cathode material layer having an improved surface roughness (2 µm root mean square or less) is provided. By "high-capacity" it is meant a rechargeable battery that has a capacity of 100 mAh/gm or greater. In some embodiments, the rechargeable battery may be a solid-state battery. The term "solid-state battery" is used herein to denote a battery whose components are all in a solid-state. A cathode material layer is provided in which at least an upper portion of the cathode material layer is composed of nanoparticles (i.e., particles having a particle size less than 0.1 µm). In some embodiments, a lower (or base) portion of the cathode material layer is composed of particles whose particle size is greater than the nanoparticles that form the upper portion of the cathode material layer. In other embodiments, the entirety of the cathode material layer is composed of the nanoparticles. In either embodiment, a conformal layer of a dielectric material can be disposed on a topmost surface of the upper portion of the cathode material layer. The presence of the conformal layer of dielectric material can further improve the smoothness of the cathode material layer.

In one embodiment of the present application, the rechargeable battery includes a cathode material bilayer structure located on a surface of a cathode current collector. In this embodiment, the cathode material bilayer structure includes a lower portion composed of first particles having a first particle size and an upper portion composed of second particles having a second particle size that is less than the first particle size. An electrolyte (solid-type, liquid-type or gel-type) is located on a surface of the upper portion of the cathode material bilayer structure. An anode region is located on the electrolyte, and an anode current collector is located on the anode region.

In another embodiment of the present application, the rechargeable battery includes a cathode material layer located on a surface of a cathode current collector. In this embodiment, the cathode material layer is composed of nanoparticles having a particle size entirely less than 0.1 µm. An electrolyte (solid-type, liquid-type or gel-type) is located on a surface of the cathode material layer. An anode region is located on the electrolyte, and an anode current collector is located on the anode region.

In yet another embodiment of the present application, the rechargeable battery includes a cathode material layer located on a surface of a cathode current collector. In this embodiment, the cathode material layer includes at least an upper portion that is composed of nanoparticles having a particle size of less than 0.1 µm, and wherein a topmost surface of the cathode material layer has a surface roughness of 2 µm root mean square or less. An electrolyte (solid-type, liquid-type or gel-type) is located on a surface of the cathode material layer. An anode region is located on the electrolyte, and an anode current collector is located on the anode region.

In any of the above mentioned embodiments, a conformal layer of dielectric material may be formed on an exposed surface of the cathode material (bi)layer to further improve the smoothness of the cathode material (bi)layer.

BRIEF DESCRIPTION OF SEVERAL VIEWS OF THE DRAWINGS

FIG. 1 is a cross sectional view of a rechargeable battery of the present application during an initial fabrication stage in which a lower (or base) portion of a cathode material layer composed of first particles having a first particle size is formed on a surface of a cathode current collector.

FIG. 2 is a cross sectional view of the rechargeable battery of FIG. 1 after forming an upper portion of the cathode material layer composed of second particles having a second particle size that is less than the first particle size on the lower portion of the cathode material layer.

FIG. 3 is a cross sectional view of the rechargeable battery of FIG. 2 after curing and performing a smoothing process.

FIG. 4 is a cross sectional view of the rechargeable battery of FIG. 3 after forming an electrolyte, an anode region, and an anode current collector.

DETAILED DESCRIPTION

Figure 5:
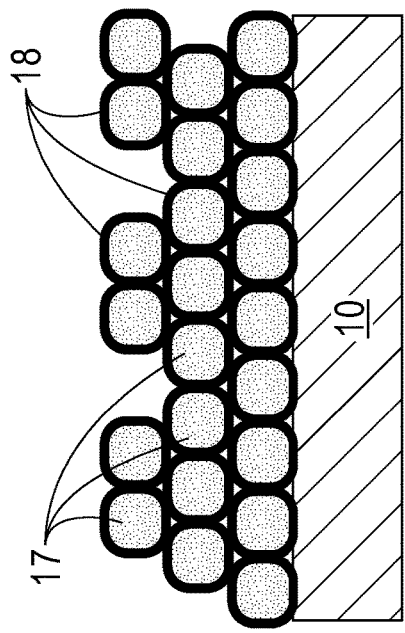
FIG. 5 is a cross sectional view of another rechargeable battery of the present application during an initial fabrication stage in which a cathode material layer composed entirely of nanoparticles is formed on a surface of a cathode current collector.

The present application will now be described in greater detail by referring to the following discussion and drawings that accompany the present application. It is noted that the drawings of the present application are provided for illustrative purposes only and, as such, the drawings are not drawn to scale. It is also noted that like and corresponding elements are referred to by like reference numerals.

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application. Throughout the present application, the acronym 'nm' denotes a nanometer, and the acronym 'μm' denotes a micrometer (or micron).

It will be understood that when an element as a layer, region or substrate is referred to as being "on" or "over" another element, it can be directly on the other element or intervening elements may also be present. In contrast, when an element is referred to as being "directly on" or "directly over" another element, there are no intervening elements present. It will also be understood that when an element is referred to as being "beneath" or "under" another element, it can be directly beneath or under the other element, or intervening elements may be present. In contrast, when an element is referred to as being "directly beneath" or "directly under" another element, there are no intervening elements present.

Figure 8:
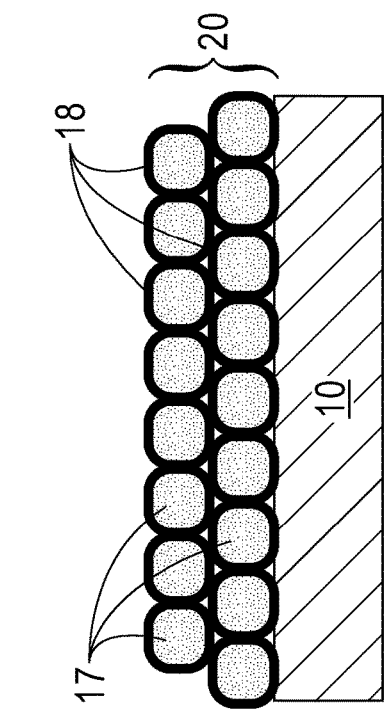
FIG. 8 is a cross sectional view of the rechargeable battery of FIG. 7 after forming an electrolyte, an anode region, and an anode current collector.
Figure 11:
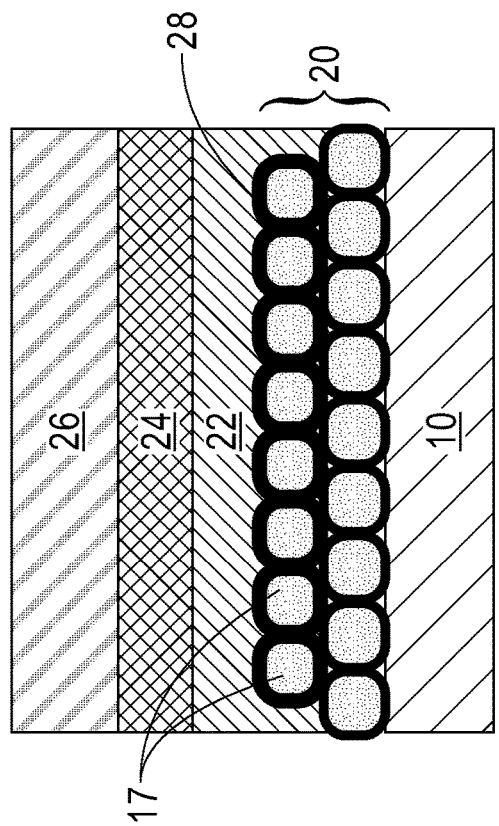
FIG. 11 is a cross sectional view of the yet other rechargeable battery of FIG. 10 after forming an electrolyte, an anode region, and an anode current collector.

The rechargeable batteries of the present application as shown, for example, in FIGS. 4, 8 and 11, contain a cathode material layer 20 that has a smooth upper surface that is composed of nanoparticles (16 of 17). In some embodiments, a cathode material having a smooth upper surface may be obtained by pressing a cathode material power having large particle sizes (i.e., the first particles mentioned herein below) with highly polished pistons in an isostatic press. This smooth upper surface of the cathode material layer 20 forms an interface with the electrolyte 22. In some embodiments, the smooth cathode surface allows for the use of a thin solid-state electrolyte. The thin electrolyte reduces the internal resistance to ionic current and shortens the distance traveled through the electrolyte 22 which may provide for a faster charging battery. In some embodiments, improved battery capacity can be obtained by forming a cathode material layer 20 that contains larger particles (12) beneath the nanoparticles (16 or 17). The larger particles provide a rough surface having increased volume. The larger particles (12) can be used to increase the thickness of the cathode material layer 20. Increased cathode material layer 20 thickness provides high charge capacity and storage. In some embodiments in which the cathode material layer is entirely composed of nanoparticles, increased charge storage can be obtained be increasing the number of nanoparticle containing layers.

Referring now to FIG. 1, there is illustrated a rechargeable battery of the present application during an initial fabrication stage in which a lower (or base) portion of a cathode material layer composed of first particles 12 having a first particle size is formed on a surface of a cathode current collector (i.e., cathode-side electrode) 10. The lower portion of the cathode material layer that is composed of the first particles 12 may include one or more layers of the first particles 12 stacked vertically one atop the other. In some embodiments, the first particles 12 that constituent the bottom portion of the cathode material layer have a rough surface greater than 2 μm) and provide a greater volume for subsequent formation of the second particles 16. The first particles 12 can be used to increase the thickness of the cathode material layer 20. Increased cathode material layer 20 thickness provides high charge capacity and storage. Thus, the first particles 12 can be used in the present application to provide an increased charge reservoir area for the battery.

Each first particle 12 having the first particle size is bound (i.e., held in chemical or physical contact) to at least one other first particle 12 by a binder material 14. As is depicted in FIG. 1, the binder material 14 is present on a surface of each of the first particles 12 having the first particle size. At this stage of the present application, residual solvent (not specifically shown) is also present in the lower portion of cathode material layer. That is, the first particles 12 and binder material 14 at this stage of the present application are wet.

The cathode current collector 10 that is used in the present application may include any metallic cathode-side electrode material such as, for example, titanium (Ti), platinum (Pt), nickel (Ni), aluminum (Al) or titanium nitride (TiN). In one example, the cathode current collector 10 includes a stack of, from bottom to top, titanium (Ti), platinum (Pt) and titanium (Ti). The cathode current collector 10 may be formed utilizing a deposition process such as, for example, chemical vapor deposition, sputtering or plating. The cathode current collector 10 may have a thickness from 100 nm to 200 μm.

In some embodiments of the present application, the cathode current collector 10 may have non-textured (i.e., planar) surfaces. In other embodiments, the cathode current collector 10 may have at least one textured surface. By "textured surface" it is meant that a material has a surface roughness in a range from 10 nm root mean square to 50 µm root mean square, as measured by profilometry or atomic force microscopy (AFM).

In some embodiments of the present application, texturing can be performed by forming a plurality of etching masks (e.g., metal, insulator, or polymer) on the surface of a material to be textured, etching the material to be textured utilizing the plurality of masks as an etch mask, and then removing the etch masks. In some embodiments, the textured surface of material to be textured is composed of a plurality of pyramids. In yet another embodiment, the textured surface is composed of a plurality of cones. In some embodiments, a plurality of metallic masks are used, which may be formed by depositing a layer of a metallic material and then performing an anneal. During the anneal, the layer of metallic material melts and balls-ups such that de-wetting of the surface of the material to be textured occurs. Details concerning the use of metallic masks in texturing a surface of a material to be textured can be found in co-pending and co-assigned U.S. patent application Ser. No. 15/474,434, filed on Mar. 30, 2017, the entire content of which is incorporated herein by reference.

In another embodiment of the present application, texturing can be performed utilizing a grinding process.

The first particles 12 that constitute the lower portion of the cathode material layer of this embodiment are composed of any electrically conductive material that is typically used in forming a cathode material layer of a rechargeable battery. In some embodiments, the first particles 12 may be single crystalline; single crystalline particles may provide a cathode material that has fast ion (e.g., Li ion) and electron transport within a rechargeable battery stack. In other embodiments, the first particles 12 may be polycrystalline. In one embodiment of the present application, each first particle 12 is a lithiated material such as, for example, a lithium-based mixed oxide. Examples of lithium-based mixed oxides that may be employed as each first particle 12 include, but are not limited to, lithium cobalt oxide (LiCoO$_2$), lithium nickel oxide (LiNiO$_2$), lithium manganese oxide (LiMn$_2$O$_4$), lithium cobalt manganese oxide (LiCoMnO$_4$), a lithium nickel manganese cobalt oxide (LiNi$_x$Mn$_y$Co$_z$O$_2$), lithium vanadium pentoxide (LiV$_2$O$_5$) or lithium iron phosphate (LiFePO$_4$).

Each first particle 12 may have any shape including, for example, spherical and oblong. The first particle size of each first particle 12 is typically from 0.1 µm to 100 µm; the particle sizes denoted herein are radial particle sizes that can be measured utilizing standard particle size measurement techniques well known to those skilled in the art. In some embodiments, each first particle has a first particle size from 10 µm to 100 µm. Other particle sizes that are greater than or lesser than the aforementioned ranges can be used as long as the first particle size is not less than 0.1 µm (i.e., within a nanoparticle size range).

In some embodiments, the first particles 12 may be annealed (700° C. or greater) prior to binding and being used in the slurry deposition process. In such an embodiment, the first particles 12 have a substantially (i.e., greater than 50 percent) octahedrally coordinated microstructure. In other embodiments, the first particles 12 may be non-annealed prior to binding and being used in the slurry deposition process. In such an embodiment, the first particles 12 have multiple crystalline structures such as, for example, a mixture of substantially (50 percent or less) under developed octahedrally coordinated microstructures. In other embodiments, the first particles 12 may be annealed at a temperature below 700° C. prior to binding and being used in the slurry deposition process. In such an embodiment, the first particles 12 have multiple crystalline structures such as, for example, substantially (50 percent or less) under developed octahedrally coordinated microstructures.

The binder material 14 that can be used in the present application includes any polymeric binder that is used in a slurry-based deposition process for binding particles used in providing a cathode material layer. Examples of binder materials 14 that can be used in the present application include, but are not limited to, styrene-butadiene rubber (SBR) and polyvinylidene fluoride (PVDF).

The residual solvent that can be present may include any non-aqueous liquid that can provide a slurry of first particles 12. One example of a solvent that can be used in the present application includes, but is not limited to, N-methylpyrrolidone (NMP).

A slurry-based deposition process can used to form the lower portion of the cathode material layer of this embodiment of the present application. The slurry-based deposition process includes providing a slurry including the first particles 12, binder material 14 and solvent. The slurry is then applied to a surface of cathode current collector 10 utilizing coating techniques that are well known to those skilled in the art.

At this stage of the present application, the lower portion of the cathode material that is composed of the first particles 12 has a rough source. By "rough surface" it is meant a material whose surface roughness is greater than 2 µm root mean square, as measured by profilometry or AFM. The lower portion of the cathode material layer that is composed of first particles 12 may have a thickness from 10 µm to 100 µm. Other thicknesses that are greater than or lesser than the aforementioned thickness range can also be provided for the lower portion of the cathode material layer that is composed of first particles 12. This rough surface advantageously provides for a greater volume, i.e., surface area, for the cathode material layer which leads to improved battery capacity; that is a high-capacity battery as defined herein is provided. In some embodiments (not shown), the first particles 12 may be subjected to a smoothing process such as, for example, pressing as mentioned above to provide an upper surface having a surface roughness of less than 2 µm root mean square.

Referring now to FIG. 2, there is illustrated the rechargeable battery of FIG. 1 after forming an upper portion of the cathode material layer composed of second particles 16 having a second particle size that is less than the first particle size of the first particles 12. The upper portion of the cathode material layer that is composed of the second particles 16 may include one or more layers of the second particles 16 stacked vertically one atop the other. As is shown, the second particles 16 of the lowest layer of the upper portion of the cathode material layer are in contact with the first particles 12 in the uppermost layer of first particles 12.

The second particles 16 having the second particle size are used in the present application to improve the surface roughness of the cathode material layer. Furthermore, the presence of the second particles 16 above the first particles 12 creates more volume, i.e., surface area, through which ionic current (e.g., Li ions) can flow through the electrolyte. This advantageously leads to improved battery capacity; that is a high-capacity battery as defined herein is provided. The second particles 12 can also provide fast ionic mobility and thus a battery having a fast charging speed, as defined herein, can be obtained.

Each second particle 16 having the second particle size is bound to another second particle 16 by a binder material 18.

As is depicted in FIG. 2, the binder material 18 is present on a surface of each of the second particles 16 having the second particle size. At this stage of the present application, residual solvent (not specifically shown) is also present in the upper portion of cathode material layer. That is, the second particles 16 and binder material 18 at this stage of the present application are wet.

In some embodiments, the second particles 16 may be annealed (700° C. or greater) prior to binding and being used in the slurry deposition process. In such an embodiment, the second particles 16 have a substantially (greater than 50 percent) octahedrally coordinated microstructure. In other embodiments, the second particles 16 may be non-annealed prior to binding and being used in the slurry deposition process. In such an embodiment, the second particles 16 have multiple crystalline structures such as, for example, a mixture of substantially (50 percent or less) under developed octahedrally coordinated microstructures. In other embodiments, the second particles 16 may be annealed at a temperature below 700° C. prior to binding and being used in the slurry deposition process. In such an embodiment, the second particles 16 have multiple crystalline structures such as, for example, substantially (50 percent or less) under developed octahedrally coordinated microstructures. The second particles may be the same as, or different from, the first particles 12.

The second particles 16 that constitute the upper portion of the cathode material layer are composed of any electrically conductive material that is typically used in forming a cathode material layer of a rechargeable battery. In some embodiments, the second particles 16 may be single crystalline; single crystalline particles may provide a cathode material that has fast ion (e.g., Li ion) and electron transport within a rechargeable battery stack. In other embodiments, the second particles 16 may be polycrystalline. In one embodiment of the present application, each second particle 16 is a lithiated material such as, for example, a lithium-based mixed oxide. Examples of lithium-based mixed oxides that may be employed as each second particle 16 include, but are not limited to, lithium cobalt oxide ($LiCoO_2$), lithium nickel oxide ($LiNiO_2$), lithium manganese oxide ($LiMn_2O_4$), lithium cobalt manganese oxide ($LiCoMnO_4$), a lithium nickel manganese cobalt oxide ($LiNi_xMn_yCo_zO_2$), lithium vanadium pentoxide ($LiV_2O_5$) or lithium iron phosphate ($LiFePO_4$). In one embodiment, each second particle 16 is composed of a same electrically conductive material as each first particle 12. In another embodiment, each second particle 16 is composed of a different electrically conductive material than each first particle 12.

Each second particle 16 may have any shape including, for example, spherical and oblong. Typically, but not necessarily always, the shape of each second particle 16 is the same as the shape of each first particle 12. The second particles 16 that are employed are nanoparticles having a particle size that is less than 0.1 μm. In some embodiments, the particle size of each second particle 16 can be from 0.01 μm to 0.05 μm. The upper portion of the cathode material layer that contains the second particles 16 may have a thickness from 0.5 μm to 100 μm.

The binder material 18 that can be used in the present application includes any polymeric binder as defined above for binder material 14. The residual solvent that can be present may include any non-aqueous liquid that can provide a slurry of second particles 16. Examples of solvents that can be used in the present application include, but are not limited to, those solvents mentioned above for providing the lower portion of the cathode material layer of the present application.

Another slurry-based deposition process can used to form the upper portion of the cathode material layer of this embodiment of the present application. This slurry-based deposition process includes providing a slurry including the second particles 16, binder material 18 and solvent. The slurry is then applied to an exposed surface the lower portion of the cathode material layer utilizing coating techniques that are well known to those skilled in the art.

Referring now to FIG. 3, there is illustrated the rechargeable battery of FIG. 2 after curing and performing a smoothing process. The curing process removes the residual solvent that is present in the lower portion and upper portion of the cathode material layer; the curing process may also cause co-mingling of the second particles 16 and ensure that the various particles are bound together. In some embodiments, curing of the lower portion of the cathode material layer may be performed prior to application and curing of the upper portion of the cathode material layer. Curing can be performed in an inert ambient such as, for example, helium and/or argon. The curing step is typically performed at a temperature that is capable of removing the residual solvent from the cathode material layer. In one example, curing may be performed at a temperature from 50° C. to 100° C. The duration of the curing process may vary depending on the residual solvent content present in the upper and lower portions of the cathode material layer and the curing temperature itself. In one example, the duration of curing at a curing temperature of from 50° C. to 100° C. can be from 30 minutes to 24 hours. In some cases, this curing can be done below atmospheric pressure to speed up curing. In the present application, no anneal is performed after cathode layer formation which changes the crystal structure of various particles that constitute the cathode material layer.

After curing, a smoothing process is typically performed. In some embodiments, the smoothing process may be omitted. The smoothing process is performed to provide a smooth surface to the upper portion of the cathode material layer. By "smooth surface" it is meant a surface of material having a surface roughness, as measured by profilometry or AFM, of 2 μm root mean square or less. In some embodiments, the smoothed surface of the upper portion of the cathode material layer may have a surface roughness of less than 0.1 μm root mean square. The smoothing process (i.e., lapping) may be performed using a roller or a high pressure press. A cathode material layer 20 having such a smooth surface can allow the use of thin solid-state electrolyte. By 'thin" electrolyte, it is meant that the electrolyte can have a thickness of 5 μm or less. A thin solid-state electrolyte may provide better battery performance and fast charge times. It is noted that for a cathode material layer 20 having a topography (i.e., a rough surface greater than 2 μm), more electrolyte will need to be deposited.

In this embodiment of the present application, and after curing and, if needed, smoothing, the lower portion containing the first particles 12 and the remaining upper portion containing the second particles 16 collectively define a cathode material layer 20 of the present application. In this embodiment, the cathode material layer 20 may be referred to a cathode material bilayer structure since it includes a lower portion of the first particles 12 and an upper portion of the second particles 16. The bilayer cathode material structure provides a thick cathode material layer (thickness of greater than 5 μm, typically from 10 μm to 100 μm) that can have, in some embodiments, a smooth surface as defined above. In such an embodiment in which a thick cathode material layer is provided improved battery capacity can be obtained. In embodiments in which a thick cathode material layer is provided the overall charging time of such a battery will increase as compared to a battery that contains a thinner cathode material layer.

At this point of the present application, a conformal layer of dielectric material (as defined in greater detail herein below) may be formed upon the surface of the bilayer cathode material layer structure shown in FIG. 3. The conformal layer of dielectric material can be applied in embodiments in which the upper portion of the cathode material layer 20 has a rough surface or to provide an even smoother surface to the upper portion of the bilayer cathode material structure. The conformal dielectric layer has an additional benefit in that it can improve overall electric properties of the electrolyte.

Referring now to FIG. 4, there is illustrated the rechargeable battery of FIG. 3 after forming an electrolyte 22, an anode region 24, and an anode current collector 26 above the cathode material layer 20 of the present application.

The electrolyte 22 that can be used in the present application may include any conventional electrolyte that can be used in a rechargeable battery. The electrolyte 22 may be in a solid-state, a liquid-state or a gel-state. In some embodiments, the electrolyte is in a solid-state. Solid-state electrolytes can provide improved consumer safety since batteries containing a liquid state electrolyte generally tend to catch on fire or explode. In some embodiments, the electrolyte 22 may be a polymer based electrolyte material or an inorganic electrolyte material. Examples of polymer based solid-state electrolyte materials include, but are not limited to, poly (ethylene oxide), poly (propylene oxide), polyphosphazene, and polysiloxane mixed with Li salts. Examples of inorganic solid-state electrolyte materials include, but are not limited to, lithium phosphorus oxynitride (LiPON) or lithium phosphosilicate oxynitride (LiSiPON). Such materials enable the conduction of lithium ions and can be electrically insulating, but ionic conducting.

When the electrolyte 22 is in a solid-state, the solid-state electrolyte may be formed utilizing a deposition process such as, sputtering, solution deposition or plating. In one embodiment, the solid-state electrolyte is formed by sputtering utilizing any conventional precursor source material. Sputtering may be performed in the presence of at least a nitrogen-containing ambient. Examples of nitrogen-containing ambients that can be employed include, but are not limited to, $N_2$, $NH_3$, $NH_4$, NO, or $NH_x$ wherein x is between 0 and 1. Mixtures of the aforementioned nitrogen-containing ambients can also be employed. In some embodiments, the nitrogen-containing ambient is used neat, i.e., non-diluted. In other embodiments, the nitrogen-containing ambient can be diluted with an inert gas such as, for example, helium (He), neon (Ne), argon (Ar) and mixtures thereof. The content of nitrogen ($N_2$) within the nitrogen-containing ambient employed is typically from 10% to 100%, with a nitrogen content within the ambient from 50% to 100% being more typical.

In some embodiments, a separator (not shown) can be present to separate a first region of an electrolyte from a second region of the electrolyte. The separator, which is typically used in cases in which a liquid electrolyte is used, may include one or more of a flexible porous material, a gel, or a sheet that is composed of cellulose, cellophane, poly-vinyl acetate (PVA), PVA/cellulous blends, polyethylene (PE), polypropylene (PP) or a mixture of PE and PP. The separator may also be composed of inorganic insulating nano/microparticles. In some embodiments, a conformal dielectric layer can be formed on the electrolyte 22 as well.

The anode region 24 may include any conventional anode material that is found in a rechargeable battery. In some embodiments, the anode region 24 is composed of a lithium metal, a lithium-base alloy such as, for example, $Li_xSi$, or a lithium-based mixed oxide such as, for example, lithium titanium oxide ($Li_2TiO_3$). The anode region 24 may also be composed of Si, graphite, or amorphous carbon.

In some embodiments, the anode region 24 is formed prior to performing a charging/recharging process. In such an embodiment, the anode region 24 can be formed utilizing a deposition process such as, for example, chemical vapor deposition (CVD), plasma enhanced chemical vapor deposition (PECVD), evaporation, sputtering or plating. In some embodiments, the anode region 24 is a lithium accumulation region that is formed during a charging/recharging process. The lithium accumulation region may be a continuous layer or a discontinuous layer. The anode region 24 may have a thickness from 20 nm to 200 µm.

The anode current collector 26 (anode-side electrode) may include any metallic electrode material such as, for example, titanium (Ti), platinum (Pt), nickel (Ni), copper (Cu) or titanium nitride (TiN). In one example, the anode current collector 26 includes a stack of, from bottom to top, nickel (Ni) and copper (Cu). In one embodiment, the metallic electrode material that provides the anode current collector 26 may be the same as the metallic electrode material that provides the cathode current collector 10. In another embodiment, the metallic electrode material that provides the anode current collector 26 may be different from the metallic electrode material that provides the cathode current collector 10. The anode current collector 26 may be formed utilizing a deposition process such as, for example, chemical vapor deposition, sputtering or plating. The anode current collector 26 may have a thickness from 50 nm to 200 µm.

Referring now to FIG. 5, there is illustrated another rechargeable battery of the present application during an initial fabrication stage in which a cathode material layer composed entirely of nanoparticles 17 is formed on a surface of a cathode current collector 10. The cathode current collector 10 of this embodiment of the present application is the same as the cathode current collector used in the previous embodiment of the present application.

Each nanoparticle 17 is bound together by a binder material 18. As is depicted in FIG. 5, the binder material 18 is present on a surface of each of the nanoparticles 17. At this stage of the present application, residual solvent (not specifically shown) is also present in the cathode material layer. That is, the nanoparticles 17 and binder material 18 at this stage of the present application are wet.

The nanoparticles 17 that constitute the entirety of the cathode material layer of this embodiment of the present are composed of any electrically conductive material that is used in providing a cathode material layer of a rechargeable battery. In some embodiments, the nanoparticles 17 may be single crystalline; single crystalline particles may provide a cathode material that has fast ion (e.g., Li ion) and electron transport within a rechargeable battery stack. In other embodiments, the nanoparticles 17 may be polycrystalline. In one embodiment of the present application, each nanoparticle 17 is a lithiated material such as, for example, a lithium-based mixed oxide. Examples of lithium-based mixed oxides that may be employed as each nanoparticle 17 include, but are not limited to, lithium cobalt oxide ($LiCoO_2$), lithium nickel oxide ($LiNiO_2$), lithium manganese oxide ($LiMn_2O_4$), lithium cobalt manganese oxide (Li- CoMnO$_4$), a lithium nickel manganese cobalt oxide (LiN-i$_x$Mn$_y$Co$_z$O$_2$), lithium vanadium pentoxide (LiV$_2$O$_5$) or lithium iron phosphate (LiFePO$_4$).

Each nanoparticle 17 may have any shape including, for example, spherical and oblong. The particle size of each nanoparticle 17 is less than 0.1 µm. In some embodiments, the particle size of each nanoparticle 17 can be from 0.01 µm to 0.1 µm.

In some embodiments, the nanoparticles 17 may be annealed (700° C. or greater) prior to binding and being used in the slurry deposition process. In such an embodiment, the nanoparticles 17 have a substantially (greater than 50 percent) octahedrally coordinated microstructure. In other embodiments, the nanoparticles 17 may be non-annealed prior to binding and being used in the slurry deposition process. In such an embodiment, the nanoparticles 17 have multiple crystalline structures such as, for example, a mixture of substantially (50 percent or less) under developed octahedrally coordinated microstructures. In other embodiments, the nanoparticles 17 may be annealed at a temperature below 700° C. prior to binding and being used in the slurry deposition process. In such an embodiment, the nanoparticles 17 have multiple crystalline structures such as, for example, substantially (50 percent or less) under developed octahedrally coordinated microstructures.

The binder material 18 that can be used in the present application includes any polymeric binder as defined above for binder material 14. The residual solvent that can be present may include any non-aqueous liquid that can provide a slurry of the nanoparticles. Examples of solvents that can be used in the present application include, but are not limited to, those solvents mentioned above for providing the lower portion of the cathode material layer of the present application.

Another slurry-based deposition process can used to form the cathode material layer of this embodiment of the present application. This slurry-based deposition process includes providing a slurry including the nanoparticles 17, binder material 18 and solvent. The slurry is then applied to an exposed surface cathode current collector 10 utilizing coating techniques that are well known to those skilled in the art.

Figure 6:
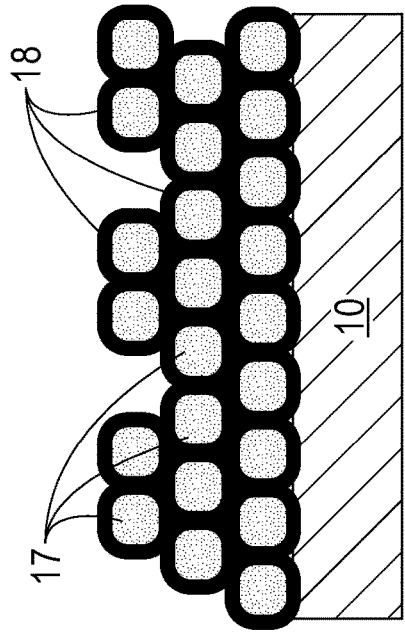
FIG. 6 is a cross sectional view of the rechargeable battery of FIG. 5 after curing.

Referring now to FIG. 6, there is illustrated the rechargeable battery of FIG. 5 after curing. The curing process removes the residual solvent that is present in the cathode material layer. Curing can be performed as described above in the previous embodiment of the present application.

Figure 7:
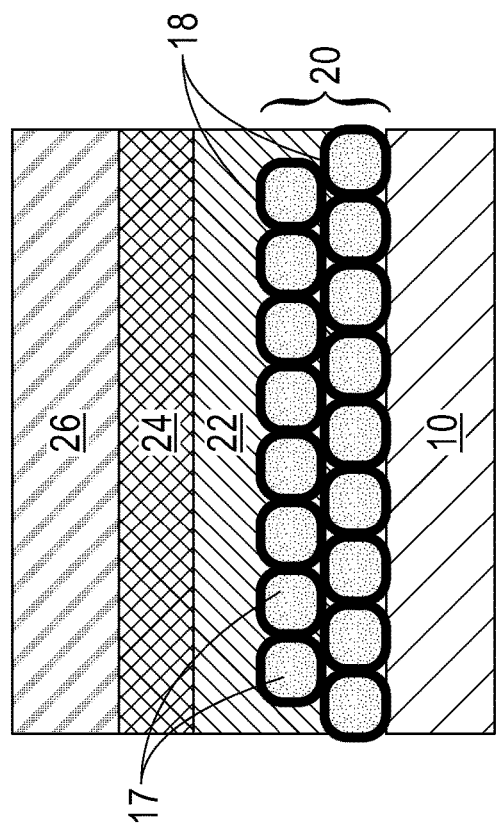
FIG. 7 is a cross sectional view of the rechargeable battery of FIG. 6 after performing a smoothing process.

Referring now to FIG. 7, there is illustrated the rechargeable battery of FIG. 6 after performing a smoothing process. In some embodiments, the smoothing process may be omitted. The smoothing process is performed to provide a smooth surface to an upper portion of nanoparticles 17 that provide the cathode material layer. By "smooth surface" it is meant a surface of material having a surface roughness, as measured by profilometry or AFM, of 2 µm root mean square or less. In some embodiments, the smoothed surface of the upper portion of the nanoparticles of the cathode material layer may have a surface roughness of less than 0.1 µm root mean square. The smoothing process (i.e., lapping) may be performed using a roller or by a high pressure press.

In this embodiment of the present application, and after curing and, if needed, smoothing, the bound nanoparticles 17 define a cathode material layer 20 of the present application. The cathode material layer 20 of this embodiment that is entirely composed of nanoparticles may have a thickness of from 1 µm to 5 µm. Other thicknesses are possible for the cathode material layer 20 of this embodiment of the present application. In this embodiment, increased capacity can be obtained by increasing the thickness of the cathode material layer 20 that contains nanoparticles 17. In some embodiments, cathode material layer 20 that is entirely composed of nanoparticles 17 can have a smooth surface as defined above.

At this point of the present application, a conformal layer of dielectric material (as defined in greater detail herein below) may be formed upon the surface of the cathode material layer 20 shown in FIG. 7. The conformal layer of dielectric material can be applied in embodiments in which the upper portion of the cathode material layer 20 has a rough surface or to further smooth the surface thereof.

Referring now to FIG. 8, there is illustrated the rechargeable battery of FIG. 7 after forming an electrolyte 22, an anode region 24, and an anode current collector 26 above the cathode material layer 20. The electrolyte 22, anode region 24, and anode current collector 26 are the same as described above for the embodiment depicted in FIG. 4. In some embodiments, a conformal dielectric layer can be formed on the cathode material layer 20.

Figure 9:
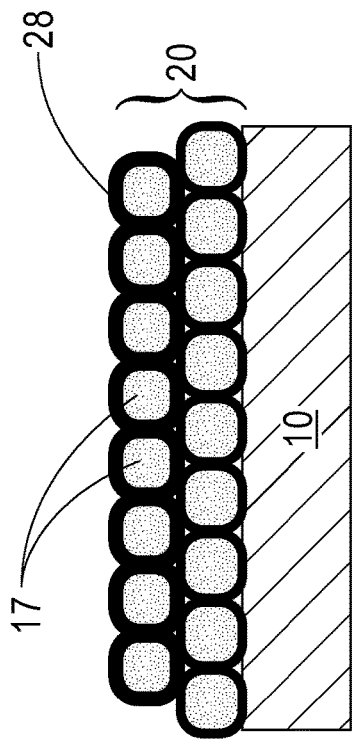
FIG. 9 is a cross sectional view of a yet other rechargeable battery of the present application during an initial fabrication stage in which a smoothed and cured cathode material layer composed entirely of nanoparticles is formed on a surface of a cathode current collector.

Referring now to FIG. 9, there is illustrated a yet other rechargeable battery of the present application during an initial fabrication stage in which a smoothed and cured cathode material layer 20 composed entirely of nanoparticles 17 is formed on a surface of a cathode current collector 10. Nanoparticles 17 are bound by a binder material 18 as defined above.

Figure 10:
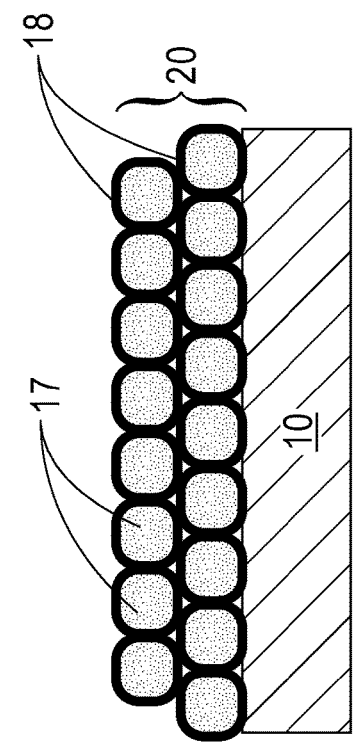
FIG. 10 is a cross sectional view of the yet other rechargeable battery of FIG. 9 after forming a conformal layer of a dielectric material on the cathode material layer.

Referring now to FIG. 10, there is illustrated the yet other rechargeable battery of FIG. 9 after forming a conformal layer of a dielectric material 28 on the cathode material layer 20. Although the conformal layer of dielectric material 28 is depicted as being formed upon a smoothed and cured cathode material layer composed entirely of nanoparticles 17 as is shown in FIG. 9, the conformal layer of dielectric material 28 may also be formed upon a smoothed and cured bilayer cathode material 20 as is illustrated in FIG. 3 of the present application or any other cathode material layer made by a slurry-based deposition process that needs a smooth surface.

The term "conformal layer" denotes a material layer that conforms to the contour of the surface of an underlying material layer that it is formed on. Thus, the conformal layer of dielectric material layer 28 conforms to the surface of the upper portion of the cathode material layer 20. The conformal layer of dielectric material 28 includes any electrically insulating and cathode ion, e.g., Li ion, conductive material. Examples of such materials that can be used as the conformal layer of dielectric material layer 28 include, but are not limited to, dielectric metal oxide such as, for example, aluminum oxide (i.e., Al$_2$O$_3$) or hafnium oxide (i.e., HfO$_2$).

In one embodiment, the conformal layer of dielectric material layer 28 can be formed utilizing any conformal deposition process such as, for example, atomic layer deposition. In another embodiment, the conformal layer of dielectric material layer 28 can be formed utilizing a water-free deposition process such as, for example, oxidation in ozone or an oxygen plasma process, or a solution based deposition process. The conformal layer of dielectric material layer 28 can have a thickness that is less than 20 nm. In one example, the thickness of the conformal layer of dielectric material layer 28 can be from 1 nm to 15 nm.

Referring now to FIG. 11, there is illustrated the yet other rechargeable battery of FIG. 10 after forming an electrolyte 22, an anode region 24, and an anode current collector 26 above the conformal layer of dielectric material 28 that is formed upon the cathode material layer 20.

It should be noted that the batteries shown in FIGS. 4, 8 and 11 can be subjected to a singulation process such as, for example, dicing, to provide multiple micro-size rechargeable battery stacks. By "micro-size" it is meant a battery stack with a lateral dimension of less than 1 mm. It should be further noted that the batteries of the present application have a high-capacity as defined above.

While the present application has been particularly shown and described with respect to preferred embodiments thereof, it will be understood by those skilled in the art that the foregoing and other changes in forms and details may be made without departing from the spirit and scope of the present application. It is therefore intended that the present application not be limited to the exact forms and details described and illustrated, but fall within the scope of the appended claims.

What is claimed is:

1. A rechargeable battery comprising:
a cathode material bilayer structure located on a surface of a cathode current collector, wherein the cathode material bilayer structure comprises a lower portion composed of first particles having a first particle size and an upper portion composed of second particles having a second particle size that is less than the first particle size, wherein the first particles and the second particles are composed of a compositionally same electrically conductive material, wherein the upper portion of the cathode material bilayer structure has a topmost surface having a surface roughness of 2 µm root mean square or less and wherein the lower portion of the cathode material bilayer structure has a surface roughness that is greater than 2 µm root mean square;
a solid-state electrolyte having a thickness of less 5 µm or less located on the topmost surface of the cathode material bilayer structure;
an anode region located on the electrolyte; and
an anode current collector located on the anode region.

2. The rechargeable battery of claim 1, wherein the cathode material bilayer structure has a thickness of greater than 5 microns.

3. The rechargeable battery of claim 1, wherein the surface roughness is less than 0.1 µm root mean square.

4. The rechargeable battery of claim 1, wherein the first particle size of each first particle is from 0.1 µm to 100 µm, and the second particle size of each second particle is less than 0.1 µm.

5. The rechargeable battery of claim 1, further comprising a conformal layer of a dielectric material located on the topmost surface of the cathode material bilayer structure.

6. The rechargeable battery of claim 1, wherein at least one of the first particles and the second particles have a substantially octahedrally coordinated microstructure.

7. The rechargeable battery of claim 1, wherein at least one of the first particles and the second particles have a substantially under developed octahedrally coordinated microstructure.

8. The rechargeable battery of claim 5, wherein the dielectric material is hafnium oxide.

* * * * *